United States Patent [19]
Allen

[11] 3,919,627
[45] Nov. 11, 1975

[54] CONDUCTIVITY MEASURING METHOD AND APPARATUS UTILIZING COAXIAL ELECTRODE CELLS

[76] Inventor: Gerald F. Allen, 532 Bucknell Ave., Claremont, Calif. 91763

[22] Filed: May 31, 1973

[21] Appl. No.: 365,617

Related U.S. Application Data

[63] Continuation-in-part of Ser. No. 61,738, Aug. 6, 1970, abandoned.

[52] U.S. Cl. ............ 324/30 R; 324/65 P; 324/30 B
[51] Int. Cl.² ................. G01N 27/42; G01R 27/02
[58] Field of Search ........ 324/30 R, 30 B, 64, 65 P; 204/195

[56] References Cited
UNITED STATES PATENTS

| | | | |
|---|---|---|---|
| 2,729,099 | 1/1956 | Rosenthal | 324/65 X |
| 2,759,149 | 8/1959 | Hart | 324/65 |
| 2,931,977 | 4/1960 | Torstenson et al. | 324/65 |
| 3,047,801 | 7/1962 | Dietert | 324/65 P X |
| 3,206,386 | 9/1965 | Kopito | 204/195 |
| 3,283,240 | 11/1966 | Spady | 324/30 |
| 3,430,130 | 2/1969 | Schneider | 324/30 |
| 3,513,384 | 5/1970 | Schneider | 324/30 |

*Primary Examiner*—Alfred E. Smith
*Assistant Examiner*—Rolf Hille
*Attorney, Agent, or Firm*—David A. Blumenthal

[57] ABSTRACT

The invention includes an electrode plate having at least one coaxial electrode positioned in an opening therein and insulated therefrom. The surface of the plate and the coaxial electrode lie in the same plane, at least in the area around the opening. The electrode or a group of four electrodes can be used to measure the conductivity of a liquid sample by either placing a drop of the sample on the coaxial cell or by placing a sorption medium thereon. When the sorption medium technique is used, a large weighted electrode is placed on the sorption medium over the coaxial electrode cell or cells. The cells are in a comparison bridge to which a high square-wave excitation frequency is applied. The signal from the cell passes through a zero crossing or null detector. This signal is fed into a phase detector system and a differential averaging filter and phase threshold bias network to actuate a pair of HI and LO indicators. Alternatively, an analog or digital readout can be obtained from an amplitude-only detector.

Also disclosed in a vacuum funnel arrangement employed with the coaxial electrode cell of the invention.

18 Claims, 17 Drawing Figures

CONDUCTIVITY MEASURING METHOD AND APPARATUS UTILIZING COAXIAL ELECTRODE CELLS

CROSS REFERENCE TO RELATED APPLICATION

This is a continuation-in-part of my application Serial No. 61,738 filed August 6, 1970, now abandoned for Conductivity Measuring Method and Apparatus, the subject matter of which is incorporated herein by reference.

BACKGROUND OF THE INVENTION

1. Field of the Invention

The invention relates to an apparatus for performing electrolytic conductivity measurement, and more particularly to the design of the electrodes and circuitry which may be used in conjunction therewith.

2. Description of the Prior Art

Reference is made to my prior application wherein the background and the prior art was extensively discussed. In that application an apparatus is disclosed which utilizes a pair of electrodes having a dielectric sorption medium disposed in a gap therebetween. Test samples are placed on the sorption material adjacent to the electrodes. The liquid constituent of the sample is drawn between the electrodes by sorption mechanisms. The electrodes and sorption medium form a portion of a bridge circuit. An A.C. signal is applied to the bridge circuit which includes a null indicating galvanometer having a rectifier network for converting the A.C. signal into a D.C. signal compatible with the galvanometer. Since only one polarity is indicated by such an arrangement, null is signified by a near zero reading on the galvanometer.

Other prior art not discussed in the previous application includes U.S. Pat. No. 3,206,386 which discloses a pair of spaced electrodes and means for positioning absorbent filter paper therebetween. A liquid sample is dropped onto the filter paper, and the paper is then inserted between the electrodes. This is, of course, in contradistinction to my previous application (as well as the instant application) in that the sorption medium utilized in my method and apparatus transports the liquid to the electrodes, as opposed to having the operator transport the saturated sorption medium to the electrodes.

A considerable amount of other background and prior art material will be found incorporated in the detailed description of the invention to provide a better appreciation for the ultimate design considerations.

SUMMARY AND OBJECTS OF THE INVENTION

A basic object of the invention is to provide a conductivity measuring device which will incorporate the use of non-platinized electrodes and square-wave excitation.

Further, an object is to provide an electrode structure which can be used both with the sorption principles set out in my earlier application and with the direct contact of liquid onto the electrodes.

Another object is to utilize the same electrode design with dip cells and flow-through cells wherein the electrode cell may be permanently connected to the conduit through which the liquid sample passes.

Another object of the invention is to provide coaxial non-platinized electrodes of a simple design wherein the effective cell constant is determined principally by external, easily measured and controlled dimensions. Once determined for a particular design, the cell constant will not have to be experimentally determined for each unit, as is the case for platinized electrodes and for designs involving several exposed surfaces not rigidly fixed to a supporting substrate, for example.

Another object of the invention is to provide an electrode cell which is suitable for severe environments and can be rapidly and easily cleaned. By eliminating the use of platinum black or other spongy surface area, contaminants will not be retained or entrapped thereon. Also, there is no enclosure to impede cleaning or application of a test sample.

Another object is to provide an electrode design which is inherently rugged and consists of a thick self-supporting metal plate with hermetic glass bonding/sealing support for a flush-surface center coaxial electrode.

Another object which is similar to that of my prior application is to eliminate the need for vacuum filtration of heterogeneous paste samples such as soil prior to making an electrolytic conductivity measurement. This eliminates numerous field-to-laboratory trips and the need for elaborate laboratory apparatus. The use of the instant invention further requires a sample of only a few grams, as opposed to the typically 250 ml samples of the prior art.

An object is to provide a device which is compact and requires no remote sensors or cells.

A further object is to provide an electrode cell arrangement which can be used with various signal processing null detection and conducting read-out circuitry.

Another object is to provide a signal processing circuit utilizing high excitation frequencies which will compensate for polarization anomalies characteristics of non-platinized electrodes.

Still another object is to provide a planar coaxial electrode assembly with platinized surfaces if much better accuracy is desired. The planar arrangement greatly simplifies cleaning and maintenance, and the coaxial positioning of electrode surfaces facilitates measurement of extremely small samples of, for example, 20–50 ml.

The invention includes an electrode plate having at least one coaxial electrode positioned in an opening therein and insulated therefrom. The surface of the plate and the coaxial electrode lie in the same plane, at least in the area around the opening. The electrode or a group of, for example, four electrodes can be used to measure the conductivity of a liquid sample by either placing a drop of the sample on the coaxial cell or by placing a sorption medium thereon. When the sorption medium technique is used, a large weighted electrode is placed on the sorption medium over the coaxial electrode cell or cells. The cells are in a comparison bridge to which a high square-wave excitation frequency is applied. The signal from the cell passes through a zero crossing or null detector. This signal is then fed into a phase detector system and a differential averaging filter and phase threshold bias network to actuate a pair of HI and LO indicators. Alternatively, a digital readout can be obtained from an amplitude-only detector.

In another modification, a simple vacuum funnel means is used to extract one or two drops of liquid from a paste sample, simultaneously allowing the extracted drop to fall on the flat plate electrode. The arrangement will permit the elimination of close filter paper control and permits use of the invention with low-hydraulic-conductivity paste samples.

BRIEF DESCRIPTION OF THE DRAWINGS

The above and as well as additional objects of the present invention will readily become apparent from the following description with reference to the accompanying drawings, wherein:

FIG. 14 is a circuit diagram of a conductivity tester in accordance with the invention and as is housed in the structure of FIG. 2;

FIG. 14($a$) is a series of waveforms associated with the circuit of FIG. 14;

DETAILED DESCRIPTION

Figure 1:
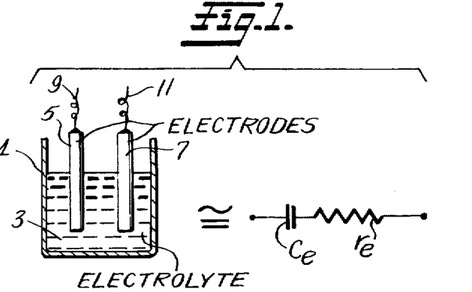
FIG. 1 is a diagrammatic illustration of an equivalent circuit resulting from the passing of current through a pair of electrodes in an electrolytic solution.

Equivalent Circuit of FIG. 1

For purposes of background, reference is made briefly to FIG. 1 which diagrammatically illustrates a container 1 having an electrolyte 3 therein. Positioned within the electrolyte are a pair of electrodes 5 and 7 with associated electrical leads 9 and 11, respectively. As illustrated, this circuit approximates a lumped-parameter electric network having resistance values $r_e$ and capacitance values $c_e$. The specific values of $r_e$ and $c_e$ are subject to electrode-electrolyte interface conditions, as well as ion-transport phenomenon. The effective $c_e$ appears to vary with the excitation frequency and wave shape, electrode surface material and condition, and the particular electrolyte. The value of $r_e$ is a function of the same variables; however, particular note should be made of the fact that the values of $r_e$ obtained from non-platinized electrodes (those without a platinum black coating thereon) do not generally correspond with values observed using the standard platinized electrodes. Since the platinizing process creates a spongy, porous surface condition, an extremely large value of $c_e$ relative to outside electrode dimensions is created. Therefore, in the presence of A.C. excitation, even as low as 60cps, the capacitive reactance becomes practically negligible. Also, apparent values of $r_e$ remain more independent of frequency parameters, this independence being presumably due to improved electrode-electrolyte interface conditions. The use of A. C. (square wave) excitation and the value of non-platinized electrodes in the instant invention will be discussed in greater detail below.

Portable Conductivity Tester

Figure 2:
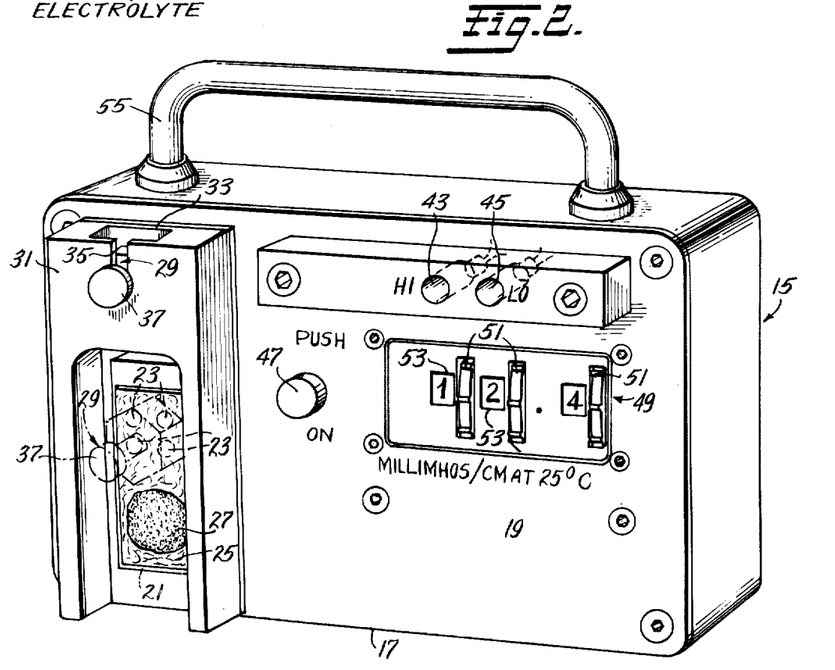
FIG. 2 is a perspective view of a portable conductivity tester in accordance with the invention.

Reference is next made to FIG. 2 which illustrates the outward appearance of a portable conductivity tester 15 in an upright position. The tester includes a housing 17 having a generally flat top wall 19 (which, when in use, will be in a horizontal position) and a flat electrode plate 21 mounted thereon, the plate being positioned adjacent one end of the top wall 19. Integral with the plate 21 and near one end thereof are a plurality of electrolytic conductivity cells 23. In the modification shown, four such electrode cells are illustrated. While the electrode cells will be discussed in greater detail below, it may be pointed out here that the electrode supporting plate 21 may be suitably plated with gold, platinum or other noble metal.

In use there is positioned on the plate electrode a piece of filter paper 25 having a slurry or paste sample 27 thereon. Over the electrodes 23 is seen a weighted electrode 29.

Surrounding the plate electrode 21 is a U-shaped protective housing and weighted electrode support fixture 31. The fixture 31 performs the function of protecting the electrode and test sample, and it also provides storage for the weighted electrode 29 in a recess 33. A slot 35 communicating with the recess 33 accommodates a thumbscrew retainer 37 on top of the weighted electrode.

Figure 3:
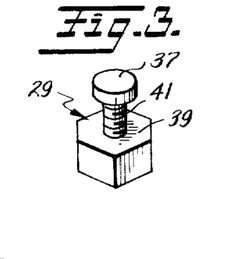
FIG. 3 is a detail of a weighted electrode.

The weighted electrode seen in FIG. 3 is illustrated as being a solid block having flat sides designed to best cover the four electrode cell cluster and resist turning when placed in the recess and secured by the thumbscrew. However, obviously, depending upon the number of electrodes, the shape and size may vary. As will be discussed in relation to FIGS. 4–6 below, the size is critical to the extent that it must be sufficiently large to cover not only the electrode or electrode cluster, but also a sizeable portion of the plate electrode 21 adjacent the cluster. An electrode body 39 is connected to the thumbscrew 37 by means of a threaded shaft 41.

The unit also has a HI LED indicator 43 and a LO LED indicator 45. An ON-OFF push button 47 is positioned to the left of a digital thumb wheel switch 49 having a plurality of thumb wheel operators 51 and corresponding windows 53, the indicators therein designed to read to millimhos/cm at 25°C. Finally, a handle 55 is used for carrying the portable unit. The remainder of the circuitry is enclosed in housing 17.

Electrode Cell Structure

Figure 4:
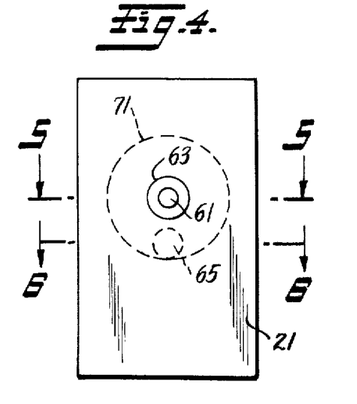
FIG. 4 is a plan view of a coaxial electrode cell in accordance with the instant invention.
Figures 5, 6:
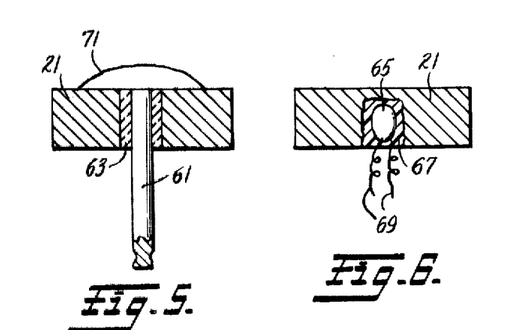
FIG. 5 is a cross-sectional view taken along lines 5—5 in FIG. 4.
FIG. 6 is a cross-sectional view taken along lines 6—6 in FIG. 4.

FIGS. 4, 5 and 6 illustrate an electrode cell structure per se wherein the plate 21 has a circular opening therethrough. An electrode element 61 is positioned coaxially therein and separated from the plate 21 by means of a hermetic glass bead seal/insulating ring 63. Positioned closely adjacent the electrode is a temperature sensing thermistor 65 embedded in an epoxy compound or other suitable insulating material 67. Appropriate electrical conductors 69 are connected to the thermistor.

It will be appreciated that the conductivity tester of the instant invention can be used both with the weighted electrode on the sorption principle and without the weighted electrode by direct contact of a liquid sample with the coaxial electrode arrangement. Therefore, a liquid sample is seen in dotted lines as 71 in FIGS. 4 and 5. The measurement of liquid samples with and without the sorption medium will be appreciated from the further discussion below. However, it may be pointed out here that the instrument calibration will have to be altered because of the different electric fields within the samples.

Operation of Sorption Principle

Figure 7:
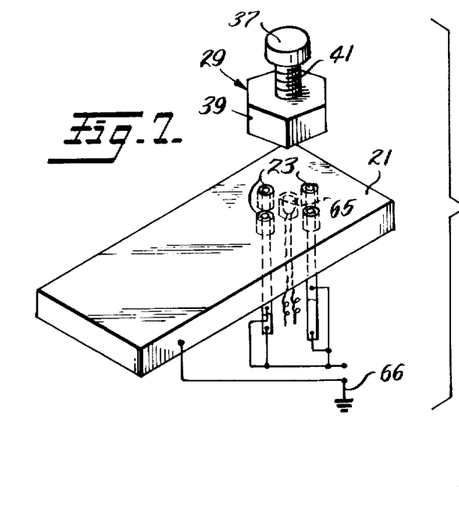
FIG. 7 is a perspective view of an electrode cell in an electrode plate with an accompanying weighted electrode positioned thereover.
Figure 8:
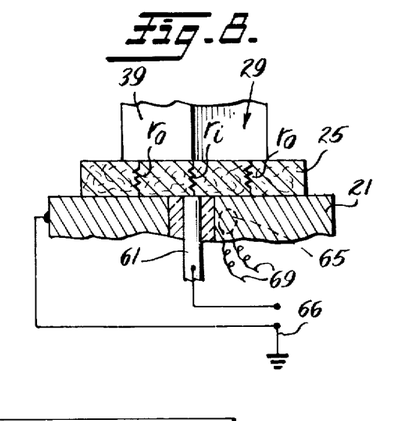
FIG. 8 is a partial cross-sectional view of an electrode cell with the weighted electrode positioned over a sorption medium.
Figure 9:
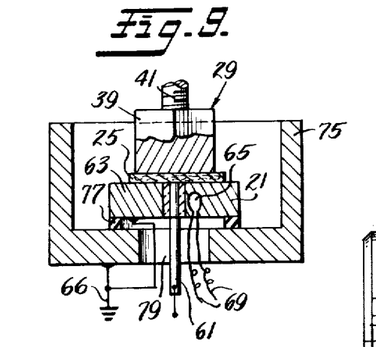
FIG. 9 is a cross-sectional view of the cell in FIG. 8 positioned within a shield.

While the accuracy is felt to be enhanced by the utilization of four coaxial electrodes in a cluster, a portion of the discussion of the principles involved will be confined to only one coaxial electrode arrangement for obvious simplicity. The arrangement in FIGS. 7–9 is identical with that illustrated in FIGS. 4–6 except that a sorption medium in the form of filter paper 25 is illustrated in FIGS. 8 and 9 rather than the liquid sample 71, and the weighted electrode 29 which is not necessary in the liquid sample test is also illustrated.

The weighted electrode 29 having a flat lower surface to conform with the surface of plate electrode 21 is positioned coaxial with the electrode 61. Alternatively, the weighted electrode can have any surface shape which conforms with the shape of the plate surface surrounding the coaxial electrode 61. As discussed in relation to FIGS. 4–6, the electrode 61 is coaxially positioned by means of the glass bead insulating ring 63. The compensating thermistor 65 is also appropriately positioned adjacent to the center electrode in a dielectric which may be of epoxy material. The coaxial arrangement provides a self-shield which minimizes the noise pick-up and capacitive unbalance induced by nearby objects such as, for example, an operator's hand. Such considerations are particularly significant when high excitation frequencies in the order of 100 kc are used. The electrode plate 21 which acts as the outer coaxial conductor is grounded at 66; and as will be seen in FIG. 8, the weighted electrode body 39 is designed to overlap the circular aperture in the plate electrode to a considerable degree.

The principle of the instant invention relative to the sorption technique is identical with that discussed in great detail in my earlier filed application Ser. No. 61,738, and that discussion is incorporated by reference. However, it will be pointed out here that the sorption strip 25 may be any sheet dielectric sorption material, the preferred sorption material having high ionic purity so that it will not contribute further ionization to the liquid that is being tested and thereby contribute error to the reading. One satisfactory type of sheet dielectric sorption material is filter paper, and a particularly desirable type of filter paper is chromatographic filter paper because of its high ionic purity. This filter paper typically has a thickness in the order of about 0.005 of an inch.

A small sample of the material to be tested, such as a saturated paste soil-water sample, or drops of water or other liquid, is placed on the exposed portion of the sorption material as at 27 in FIG. 2. The liquid-enclosing phase of the sample is drawn into the sorption strip by sorption mechanisms (such as absorption, adsorption, capillarity, and the like). A sufficient amount of the sample is placed on the sorption strip to enable the strip to become saturated with the liquid. These sorption mechanisms cause the gathered liquid to be transported from the exposed gathering portion of the sorption strip along the strip into the position of the sorption material that is disposed between the electrodes, i.e., that portion seen in FIG. 8. Separation of the liquid-enclosing phase from the main body of solids, as in soil testing, is accomplished during this gathering part of the operation. However, filtration of unwanted dispersed particles and compounds from the liquid-enclosing phase is accomplished during transport. Thus, as discussed in my above-mentioned patent application, filtration is by a controlled surface transport or sorption mechanism in a longitudinal direction in the filter paper or other sorption material; whereas, conventional filtration depends upon passage transversely through the filter paper or other filtering medium.

Again referring to FIGS. 8 and 9, the overlap of the weighted electrode is deliberately kept large to minimize the resistance of the path between the lower electrode plate 21 and the weighted electrode body 29 as compared to the resistance between the center electrode 61 and the weighted electrode body. Thus, the electrical potential of the weighted electrode is maintained very close to ground potential, making it possible to achieve almost perfect shielding and to minimize effects of residual peripheral electric field. FIG. 8 illustrates, in effect, a simplied electrical equivalent of the circuit created by the electrodes and sorption medium. While is is desirable that the weighted electrode be centered relative to the center electrode 61, accurate placement is not critical so long as there is a large overlap. The resistance actually measured is determined primarily by the portion of the sample located between the center electrode 61 and the lower surface of the weighted electrode.

The following expression illustrates the resistance characteristics:

$$r_o \ll r_i$$
$$r_t = r_o + r_i \approx r_i$$

where $r_o$ is the resistance distributed around the periphery of the sealing bead 63 and $r_i$ is the resistance between the center electrode 61 and the weighted electrode 29 through the filter medium. Therefore, the total resistance $r_t$ is essentially equal to $r_i$.

In the modification illustrated, the weighted electrode body 39 has a lower surface diameter of five-eighths inch or greater, and the electrode plate 21 has an aperture of about 2.7 mm in diameter with the center electrode 61 having a 0.8 mm diameter. A conductive housing 75 is seen in FIG. 9 surrounding the test area to provide maximum shielding effectiveness. Gaskets 77 are positioned between the plate 21 and the housing to provide electrical insulation therebetween, and to provide an area for liquid to accumulate and not contact the electrode 21. Finally, an opening 79 is positioned in the bottom of the housing to receive the center electrode.

It should be noted that the weighted electrode provides a constant compressive force on the sorption test strip. However, in practice, entrapment of minute air bubbles by the advancing front of liquid as it is moved from point 27 to the point between the electrodes has been found to possibly introduce large variances in measurements. Therefore by the simple process of lifting the wet sorption strip 25 in the vicinity of the coaxial contacts and allowing the strip to relay itself on the plate will successfully eliminate the problem.

Direct Contact Cell

As was discussed in relation to FIGS. 4–6 above, it is possible to eliminate the need for a sorption filter medium. Therefore, the flat plate electrolytic conductivity cell as illustrated in FIGS. 4–5 can provide a cell wherein a drop of liquid 71 as seen in FIG. 5 may be placed on the cell. Another direct contact type of cell appears in FIGS. 10 and 11 wherein the device is adapted for use as a dip or flow-through measurement. The only essential difference between the designs of FIGS. 4–6 and of FIGS. 10 and 11 is that in the dip and flow-through designs threading and use of gaskets is required for installation in, for example, a piping system.

Figure 10:
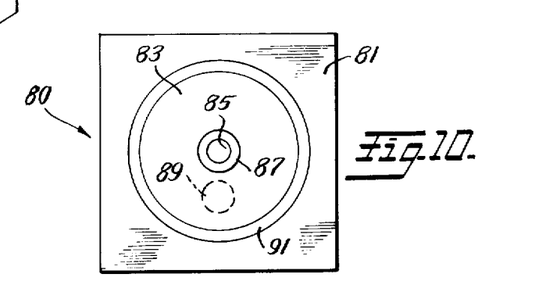
FIG. 10 is an end view of a dip cell in accordance with the instant invention.
Figure 11:
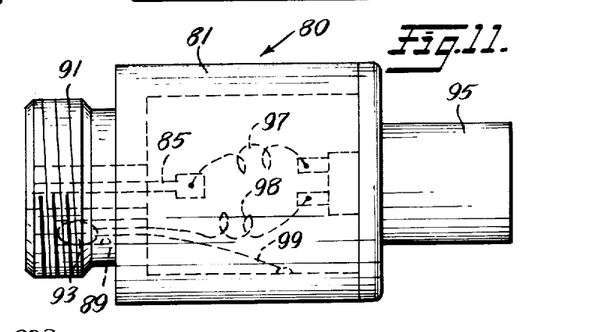
FIG. 11 is a side view of the dip cell of FIG. 10.

Referring to FIGS. 10 and 11, a sensor 80 is seen having a housing 81 with a flat gold-plated electrode surface 83 electrically integral with the housing 81. A coaxial electrode 85 is centrally located in the flat surface 83 and separated therefrom by a glass bead hermatic seal 87. The surface of this electrode, as in the case of electrode 61 can be gold-plated concurrently with the flat electrode 83. A cavity 89 is positioned in a threaded mounting portion 91 which surrounds the cell. A temperature compensating thermistor 93 is imbedded in the cavity adjacent the surface 83. A twin lead coaxial connector 95 can be used to connect the sensor to circuitry, such as that for example in FIG. 14. A connecting lead 97 connects the center electrode to the connector. For electrical convenience and economy, lead 98 connects one terminal of the thermistor to the connector while lead 99 grounds the other terminal of the thermistor to the housing 81. Again, the surface electrode 83 is electrically integral with the housing 81 as is one terminal of the coaxial connector 95 when the associated input network permits.

It will be appreciated that the threaded mounting 91 can be secured to a pipe wherein the electrodes 83 and 85 are in communication with the liquid therein. This will permit continual or periodic testing of the liquid. Obviously, in many instances this may be more desirable than placing the liquid directly onto the cell illustrated in FIGS. 4–6. Both of these arrangements are, of course, used when it is not necessary to utilize a sorption medium to transport the liquid to the electrodes.

Electrical Characteristics

Figure 12:
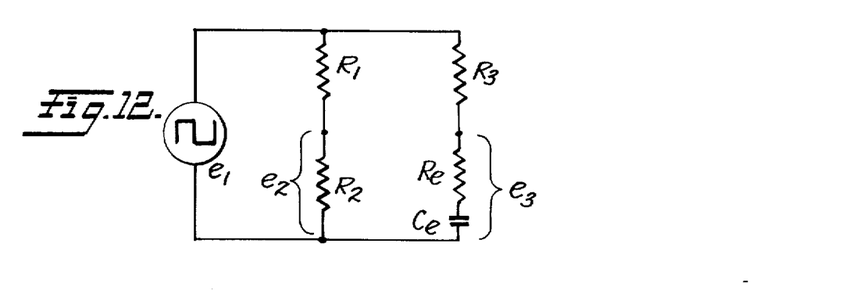
FIG. 12 is a circuit diagram of the equivalent circuit of a comparison bridge.
Figure 13:
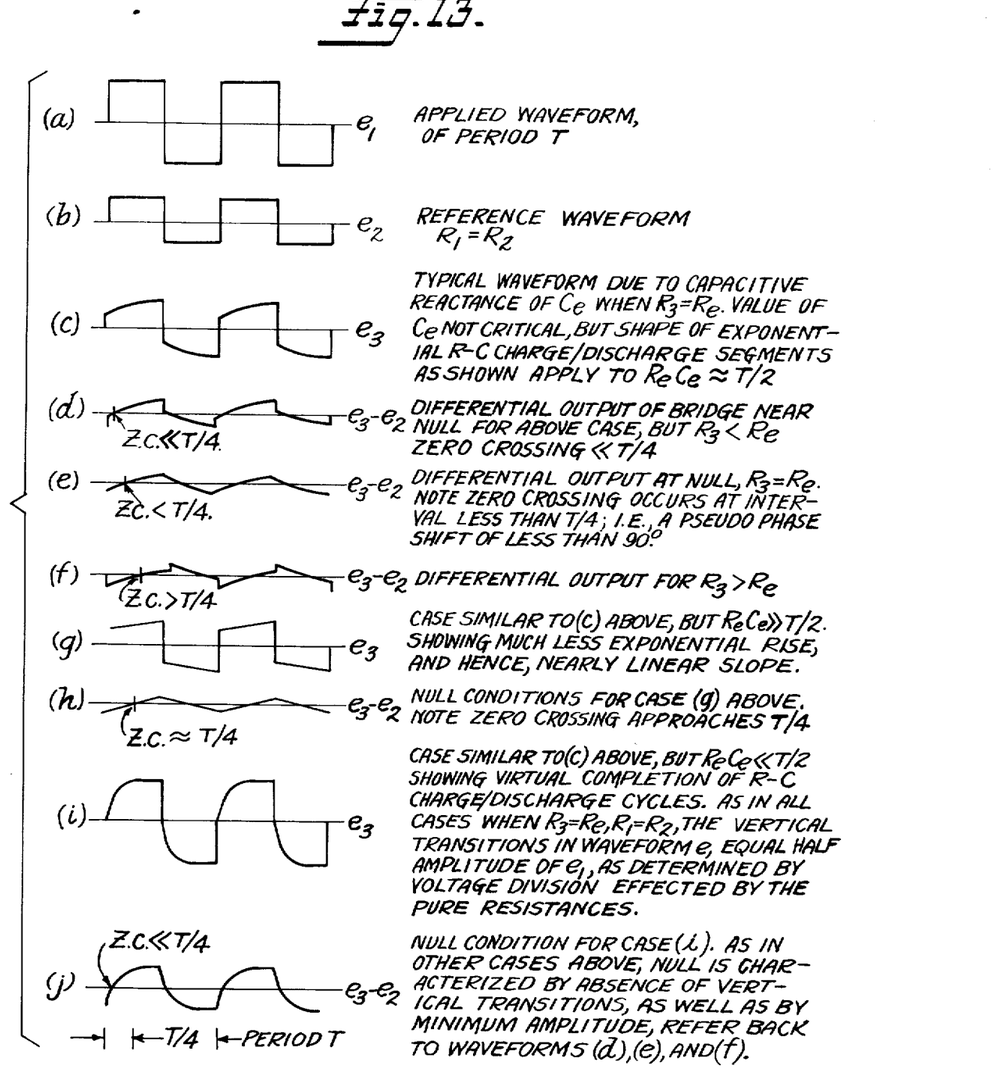
FIG. 13 is a series of waveforms associated with various conditions of the circuit of FIG. 12.
Figures 14, 14A:
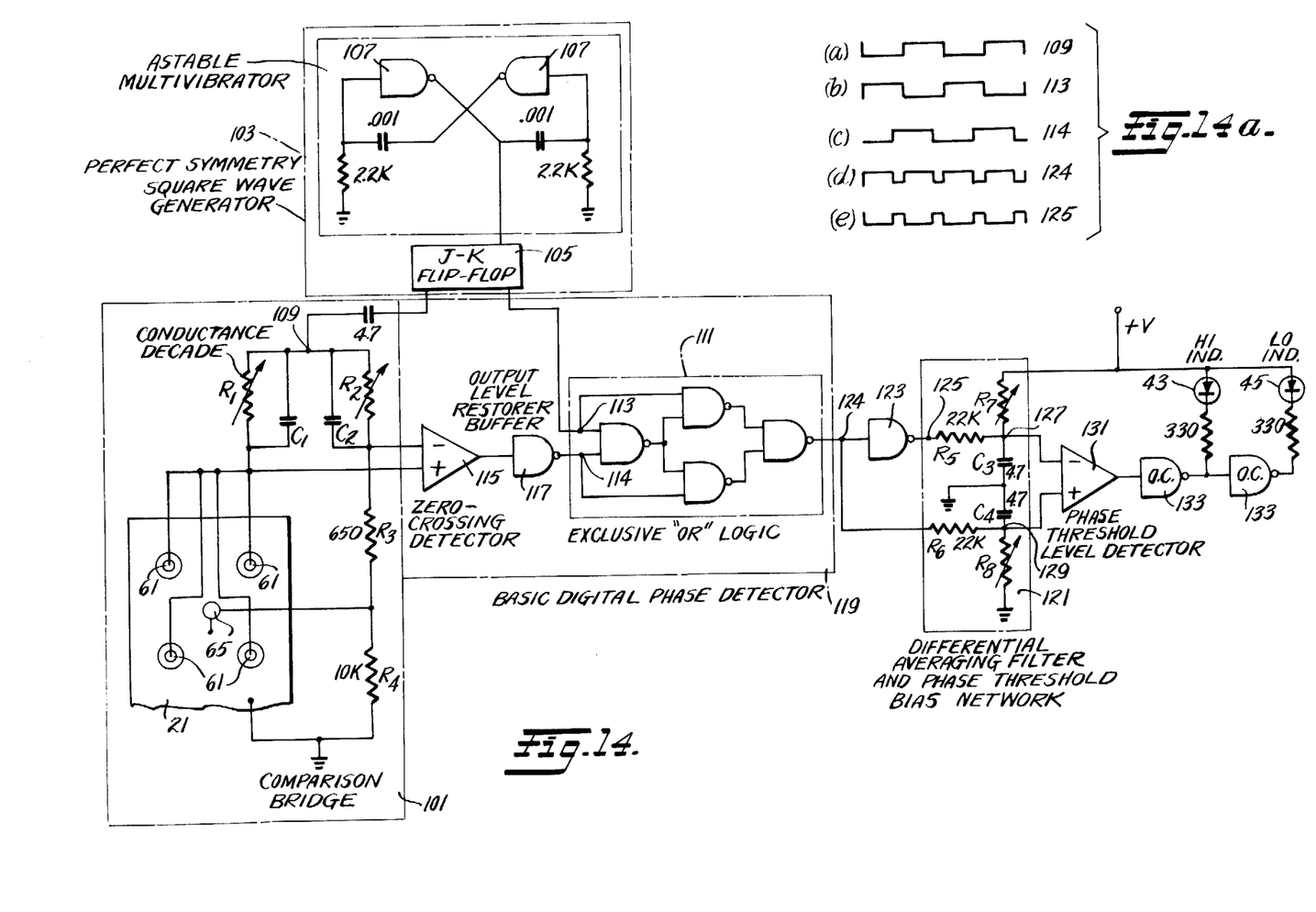

Prior to discussing the specific circuitry illustrated in FIG. 14, it is felt that a better aappreciation of the invention will be obtained from a discussion of the equivalent bridge circuit illustrated in FIG. 12 and the waveforms illustrated in FIG. 13.

Virtually all bridge comparison systems include some form of null detector to identify the balance and out-of-balance states. In comparison bridge circuits known values are compared with unknown values until equality is indicated, at which point the value of the known variable equals or is capable of identifying the unknown value being sought.

Null indicators are of necessity more complicated when A.C. excitation is used. The simplest circuitry includes a rectifier network as illustrated in my previous patent application Ser. No. 61,738, the network converting the differential A.C. signal into a D.C. signal compatible with the associated D.C. null indicator. Only one polarity is indicated by such an arrangement, and the null is signified by a minimum reading. However, if reactive components are present with cell/sample that vary the phase relationship of the differential signals sensed by the null indicator, the amplitude null broadens and visually fails to convey information most accurately.

The null-detection technique usually found most satisfactory in accurate A.C. excited comparison or bridge circuits is some form of phase detector or phase demodulator. However, an A.C. ohmmeter in series with the A.C. source and the sample may be sufficient in certain instances.

As stated above, one of the objectives of the invention was to eliminate the need for platinized electrodes and their inherent disadvantages. Thus the use of a square-wave excitation was found to minimize the discrepancy between known and observed values of electrolytic conductivity (or its inverse, resistivity) when simple metallic, non-platinized electrodes were employed. The improvement obtained with high frequency square-wave excitation is believed to be due to the extremely short rise time which minimize the response lag relative to the period of the waveform. Waveforms illustrated in FIG. 13 illustrate the square-wave excitation of the bridge of FIG. 12. The significance will be appreciated in relation to the bridge network of the invention as illustrated in FIG. 14. FIG. 12 illustrates a bridge circuit having a series R-C circuit ($r_e$ and $c_e$) which approximate the conductivity cell created in the instant invention utilizing non-platinized electrodes.

The observed departure of actual sample behavior from the simplified R-C network will be appreciated with reference to the voltage waveform $e_3$. This waveform appears to suggest a quasi-constant-current capacitor charge/discharge network or integrator, rather than a simple R-C network. That is, the exponential tail-off or flattening portion observed across the capacitor approaching full charge in a simple series R-C network does not appear to occur in highly-conductive electrolyte samples. This is probably due to low-speed ion transport through an excited electrolyte.

However, with low-conductivity test samples, the reactive influence of $c_e$ is almost negligible, and the bridge output waveform resembles that shown in FIG. 13 (h). Under such conditions the amplitude approaches zero at null. Very slight changes in bridge balance conditions lead to an effective phase transition of nearly 180° (or T/2); thus, the selection of a phase discrimination threshold for a phase sensitive null detector is not at all critical.

On the other hand, with high-conductivity test samples, the reactive contribution of $c_e$ becomes appreciable, leading to a waveform similar to that in FIG. 13 (g). In such cases the shift in zero crossing location, as a transition is made through null, becomes comparatively small.

It was found that the phase discrimination threshold under high-conductivity conditions can be experimentally shifted to compensate almost perfectly the disproportional resistivity indications in the presence of non-platinized metallic electrodes. This compensatory shift has a much greater effect on the null balance registration in high-conductivity cases than in low-conductivity cases. In conjunction with bridge balance adjustment, the phase threshold adjustment can be made such that known electrolytic conductivity or resistivity samples track very closely with known pure bridge-balancing read-out resistances at widely separated points. The compensatory transition between low and high conductivity values corresponds closely with the observed disproportionate behavior of non-platinized electrodes, yielding high accuracy within about one percent over a dynamic range of 200 to 1 or greater.

Thus, square-wave excitation in conjunction with a variable threshold phase detector results in a "well-behaved" conductivity measurement without recourse to platinized electrodes or especially designed bridge-balancing conductances (or resistances).

It will be appreciated that the advantage of maintaining proportionality between measured resistivities and actual lumped resistance values within the measurement bridge is that accurate decade scaling and switching can be used. Otherwise, a specially non-linearly calibrated dial is required which does not lend itself to fine resolution or unit-to-unit accuracy. The various conductivity-related instruments that have been produced in the past without platinized electrodes have required either specially designed read-out dials or a calibration curve relating decade resistance values to test sample resistivity (or conductivity). Because the proportionality is preserved with the electronic circuitry aspects of the invention, direct decade read-out is possible.

It will be appreciated that the square-wave excitation and phase detection system presented is applicable to electrolytic conductivity (or resistivity) cells in general—not merely to strip-sorption cells. Accordingly, the invention covers other electro-chemical applications of non-platinized electrodes. Replacing platinized electrodes with metallic electrodes such as gold plate not only reduces electrode cost enormously, but also eliminates the problem of contamination inherent with fragile, spongy, porous platinized surfaces.

Electrical Circuit

Referring to FIG. 14, the circuitry of the instant invention has a Comparison Bridge 101 including plate 21 and four coaxial electrode cells 23 clustered as seen in FIG. 2. The coaxial electrode arrangements include the center electrode 61 and the thermistor 65.

The use of the cluster of electrode cells 23 appears in many instances to accommodate for point-to-point variations in composition or "clumping" inherent in filter paper. By increasing the number of coaxial cells or coaxial electrode surfaces to four and electrically connecting these surfaces in parallel, spacial averaging is achieved. If one were to assume a random distribution of inhomogeneity, the error introduced thereby would be reduced theoretically by a factor of $n$ to the one-half power wherein $n$ is the nunmber of cells. In other words, the accuracy would be increased by the square root of the number of cells. By using four cells it would appear that the error would be reduced by a factor of two.

The remainder of the bridge resistors are similar to those shown in FIG. 12. The resistance $R_1$ is adjustable and is in the form of the digital thumb wheel switches 51 illustrated in FIG. 2. It includes resistances adjustable for 200 ohms for 10 millimhos/cm; 2000 ohms for 1.0 millimhos/cm; and 20,000 ohms for 0.1 millimhos/cm. The adjustable resistance $R_2$ is a bridge balancing or cell constant resistance and is approximately 1.5 k ohms.

It will be appreciated that because the proportionality is preserved with the electronic circuitry aspects of this invention, direct decade readout is possible. Thus, the digital thumb wheel switch 49 ($R_1$) having three decades is used. The conductivity proportionality is achieved by paralleling resistances via either 1-2-4-8 BCD, or a 1-2-3-4 capacitance decade coded switch sections. For example, with a 1-2-4-8 BCD code, four resistances scaled to ½, ¼ and ⅛ can be wired in to generate resistances scaled from 1 to 1/9, corresponding to conductivities scaled from 1.0 to 9.0 respectively. At, for example, the "9" setting, the 1.0 resistance is placed in parallel with the ⅛ resistance, giving a resistance value of 1/9. Thus, using only four precision resistors per decade, or using a standard resistance per conductance decade, a direct-reading conductivity (or resistivity) measuring instrument can be readily constructed.

A pair of capacitors $C_1$ and $C_2$ are positioned across the resistances $R_1$ and $R_2$, respectively. Capacitor $C_1$ is a compensating capacitor and is adjustable to nullify stray reactance errors under low-conductivity (high-resistivity) conditions. Also, capacitance $C_1$ (and if required, $C_2$) controls the disparity between phase and amplitude null by modifying the peaking and imperfect transition in the waveform of the differential input to the capacitor. These imperfect transitions are the result of the complex electrical network presented by the electrolytic sample under test.

The means for applying the square-wave excitation and assuring phase integrity includes the Square-Wave Generator or excitation circuit 103. This circuit includes a divide-by-two flip-flop 105 to assure perfect waveform symmetry and a free running pulse generator in the form of an Astable Multivibrator having a pair of NAND gates 107. The frequency generated is significantly greater than the usual 20 KHz — more in the order of 125–175 KHz. The Square-Wave Generator 103 is connected to the Comparison Bridge circuit at 109 and to an Exclusive OR Logic circuit 111 at 113. The Comparison Bridge circuit is connected to the Exclusive OR Logic circuit at 114 through a Zero Crossing Detector 115 and an inverter 117 functioning as an Output Level Restorer Buffer. The Zero Crossing Detector 115, the Output Level Restorer Buffer 117 and the Exclusive OR Logic circuit 111 all form a Basic Digital Phase Detector 119.

Zero Crossing Detector 115 is basically a high gain amplifier which yields a full limit output level depending upon the polarity of a millivolt-level (or less) differential input voltage. The (+) input signifies the non-inverting input terminal, while the (−) input signifies the inverting terminal. If the (+) terminal is more positive than the (−) terminal, the output level is high positive (logic level 1); if the (+) terminal is relatively negative, the output level is low (logic level 0). Thus, any instantaneous bridge unbalance causes a discrete output level capable of driving the Exclusive OR Logic circuit.

The Detector 119 is coupled to a Differential Averaging Filter And Phase Threshold Bias Network 121 by means of an Inverter 123. The connection points between the Detector and the inverter is point 124, and between the inverter and the filter is point 125.

The Differential Averaging Filter and Phase Threshold Bias Network 121 includes a plurality of resistors $R_5$, $R_6$, $R_7$ and $R_8$ in bridge fashion. A pair of capacitors $C_3$ and $C_4$ are connected to ground and to points 127 and 129. The outputs of the filter and network 121 are connected via points 127 and 129 to a Phase Threshold Level Detector 131 which is of the same type as Zero Crossing Detector 115. Connected to variable resistor $R_7$ are the pair of HI and LO LED indicators 43 and 45. Connected to the other side of the LED's are a pair of open-collector type inverters 133. These are also connected to the output of the Phase Threshold Level Detector 131.

By reference to the waveforms in FIG. 14(a) the operation of the circuit in FIG. 14 will be better appreciated. The square wave generator 103 generates waveforms (a) and (b) at points 109 and 113, respectively. Waveform (c) as well as waveform (b) are applied to the Exclusive OR Logic circuit, and the action of the circuit results in waveform (d) at point 124. The waveform is inverted by the action of the inverter 123 and produces the waveform (e). If instead of the exemplary conditions illustrated, the wave shift (or more properly, the zero crossing shift) between waveforms (b) and (c) is 90° (or ¼ of the fundamental period), waveform (d) becomes a symmetrical square wave, as does its complement waveform (e). At this point the average D.C. levels at points 127 and 129 are equal, except as being biased by resistors $R_7$ and $R_8$. Without $R_7$ or $R_8$, the phase threshold level would be 90°, and any departure therefrom could switch the state of the driven comparator. The threshold bias level can be adjusted via $R_7$ and/or $R_8$, or other equivalent means, such that a given degree of compensatory waveform (d) applied through resistance $R_6$ to point 129 and (e) applied through resistance $R_5$ to point 127 on balance becomes necessary to effect a transition or registration by the HI and LO indicators. This adjustment of $R_7$ and $R_8$ compensates for the disproportionate calibration that otherwise would result from the use of non-platinized electrode surfaces.

The LED indicator are labeled to signify whether or not the conductance decade (variable resistance $R_1$) is set too high or too low relative to the sample being tested. This is analogous to the function performed by a highly sensitive null galvanometer. Of course, the conductance (or resistance) decade can then be adjusted accordingly until a unit change in a least significant resistance increment either causes both indicators to light, or effects a high-low transition.

Thus, two filtered average-value outputs at 127 and 129 drive the comparator or detector 121 whose output is one of two states, depending upon the polarity of the difference between the two average-value inputs. The comparator in turn drives the indicators 43 and 45, actuating one or the other depending upon the polarity of the differential input to the comparator. This input depends upon the relative phase or zero-crossing points of the digital phase detector inputs. The particular indicator energized by any one time indicates the "direction" of phase unbalance in a manner analogous to a "plus" or "minus" reading of the conventional null meter.

The balanced RC filter network 121 which is driven by the waveforms (d) and (e) offers a simple means for cancelling steady-state voltage level drifts due, for example, to power supply variations, electronic component and semi-conductor variations, the drifts being relative to time and temperature. It will readily be appreciated that this aspect of the invention provides a significant improvement over the prior art in that the indicators will reflect the state of the sample being tested and not be influenced by extraneous functions.

It is possible to effect the non-linearity compensation, required in general for non-platinized electrodes, through a resistance in series with the conductance decade $R_1$. Compensation is achieved by biasing or unbalancing the complementary outputs of the dual R-C integrating filter; however, this unbalance can adversely affect circuit sensitivity to power-supply-voltage and ambient-temperature variations. Thus in many applications, it has been found advisable to maintain near-perfect symmetry in the filter and comparator circuitry. The resistance value of the aforementioned series resistor is less than that of the highest decade conductance and thus is virtually insignificant at low-conductance settings of the decade. At higher conductance settings, however, the overall conductance of the series-resistor/decade combination is actually less than if the series resistor were absent. This is the direction in which compensation must be applied when non-platinized electrodes are used. The exact value of the series resistance may be tailored empirically to obtain the highest degree of conformity between conductance decade readings and known values of electrolyte samples, over the desired range of conductivity. It is to be noted that since perfect compliance may probably be achieved at only two or three points over the decade range, the useful range is constrained. Experience has indicated that a dynamic range of over 300 to 1 is possible, with a worst-case tracking error in the order of 1%. Of course, a range selector switch can be provided to allow as many such ranges as may be desired (within limits of practically and effective cell constant of the electrode assembly).

Several aspects of the circuitry which provide a more accurate instrument are as follows: First is the use of the square wave conductivity cell excitation to reduce polarization effects and non-linearity in apparent sample resistivity and which is obviously immediately compatible with digital techniques. Second is the incorporation of the high-gain comparator to convert the comparison bridge differential output signal to binary zero-crossing information which quantitizes the "phase" information. Third is the use of the standard Exclusive OR or Exclusive NOR Logic configuration to effect the phase or zero-crossing comparison. Finally, extracting the average D.C. level from the logic output pulse train via the averaging filter 121 and performing the identical operation on the complementary logic output (waveforms (d) and (e)) yields two voltage levels that are equal only when the logic outputs are symmetrical square waves, and the circuit remains relatively free of D.C. reference or component drifts. The symmetrical square wave output is indicative of a 90° phase difference or a T/4 differential in zero-crossings (where T is equal to the period of a binary output waveform cycle). The filtered average values may be simply biased or summed with D.C. reference potentials such that equality of output level occurs at any desired phase point other than 90°.

Thus, the usually fragile and costly meter movement in sensitivity controls normally required is replaced by a more reliable lower-cost indicating device utilizing solid-state light-emitting diodes.

Digital Read-out Design

It has been found that by using the above-discussed coaxial electrode cell arrangement improved results can be obtained even in circuit arrangements similar to that illustrated in my prior application. Of particular interest in this regard is the fact that higher frequencies tend to inhibit ion migration within a sample. Also, the higher the frequency, the greater the unwanted capacitive and inductive reactance effects of the lead wires and electrolytic conductivity cell configuration. Thus, the use of the small coaxial electrode cell has proved extremely advantageous for use with high frequencies in the order of 100 KHz when a non-platinized electrode arrangement is used. The coaxial arrangement yields advantages analogous to advantages exhibited by coaxial designs in the r-f communication act.

While the phase detector approach illustrated in FIG. 14 is advantageous in that it minimizes the nonlinearities introduced by the capacitive reactance of the sample liquid in contact with non-platinum black electrode surfaces, there are instances when the less expensive amplitude only detection arrangement is adequate. Further, various series and other resistance networks as discussed above have been designed to be incorporated with the bridge circuit linearize the read-out values and/or to allow the use of a conductance decade.

It has been found that the advantage of the coaxial electrode cell configuration is its inherent ability to accept r-f excitation with minimal stray reactance, radiation and sensitivity to external influences. Furthermore, r-f energy tends to conduct along surfaces rather than through bulk media. Therefore, by placing a sample drop such as 71 in FIG. 5 on the coaxial electrode, the lower surface of the electrolyte acts as the conducting plane or disc shunting the coaxial electrodes and the field is contained principally in the interface plane. Since conduction tends to be across the surface rather than through the sample, it appears that the capacitive character of the sample/cell combination will be minimized and accordingly, minimize non-linearity due to reactive effects. This structure further takes advantage of the high excitation frequency required when small samples are being tested to minimize the disparities due to ion transport or polarization anomalies.

Figure 15:
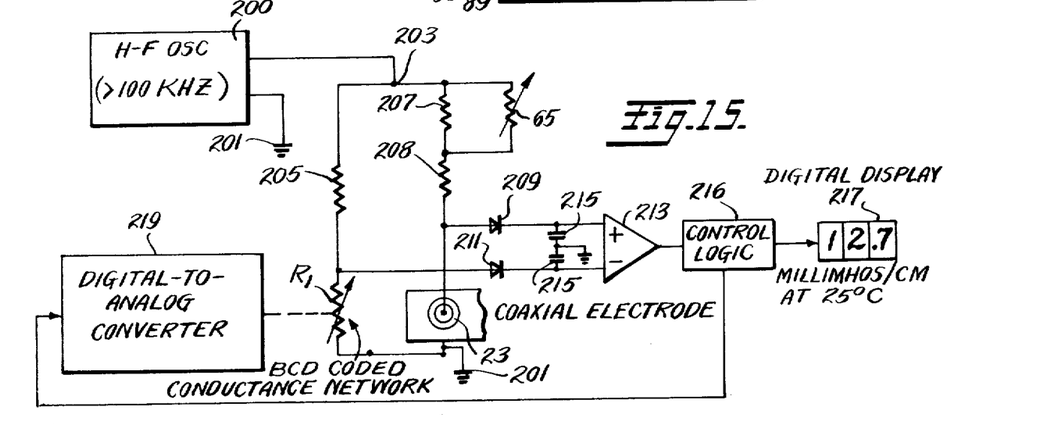
FIG. 15 is another typical circuit utilized with the electrode cells of the instant invention.

Therefore, the relatively simple circuitry illustrated in FIG. 15 can be advantageously utilized with the coaxial electrode arrangement. It will be noted from this figure that a High Frequency Oscillator source 200 (above 100 KHz and possibly as high as 1,000 KHz) has one terminal connected to ground at 201 and another terminal connected at 203 to a bridge network. The bridge includes the coaxial electrode arrangement 23 as discussed above and a BCD coded conductance network $R_1$ of the type described in FIG. 14. A bridge calibration resistor 205 and temperature compensating network resistors 207 and 208 are included in the bridge, as well as a temperature compensating thermistor 65 which is embedded in the coaxial cell in the manner discussed above. A pair of r-f rectifier diodes 209 and 211 and a pair of filter capacitors 215 connect the bridge to a null detector comparator 213. The output of the comparator is connected to a control logic circuit 216 which in turn controls the production of a Digital Display 217. A Digital-to-Analog Converter 219 is also connected to the Control Logic circuit 216, the converter 219 being coupled to the conductance network for varying same to provide the proper balance with the coaxial electrode.

The obvious advantage of the above circuit is that it provides a simple circuit and yet does not require any manual positioning of a knob of thumb wheel switch.

Vacuum Funnel Design

Many pastes such as pastes of certain soil types exhibit very slow passage or diffusion of water, and are appropriately referred to as low-hydraulic-conductivity soils. The limiting mechanisms are not thoroughly understood but are chemical as well as mechanical (particle size) in nature.

Figure 16:
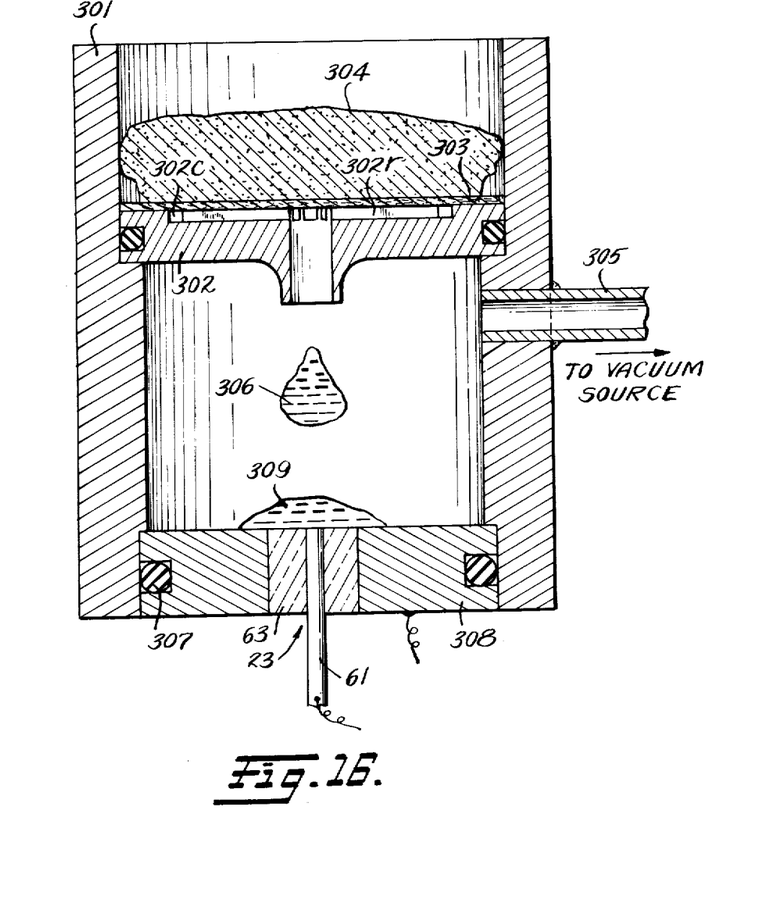
FIG. 16 is a modification of the invention wherein the electrode cell is utilized with a vacuum funnel means for obtaining a drop of liquid to be tested.

Such soils (or other matter) can strongly resist the sorptive action of the system test strip (filter paper) included as part of this invention, precluding adequate wetting of the strip. A most expeditious resolution of the problem is obtained from a novel modified Buechner funnel illustrated in FIG. 16 which includes a basic housing 301, and a filter paper support 302 having radial and coaxial troughs 302r and 302c, respectively which supports a small standard filter paper dish 303 (not construed as a sorption column or sheet as described elsewhere herein) and a paste sample 304. When vacuum conditions are applied via a small pump to outlet 305, for example, drops 306 are extracted almost immediately. An O-ring or other seal 307 permits a vacuum seal between a flat plate electrode assembly 308 and the funnel body 301. If the funnel body 301 is made of transparent material such as glass or acrylic plastic, the body can be quickly positioned over the coaxial electrode cell 23 such that drops 306 can be made to fall directly on the cell aperture 63 as shown by 309. The operator then merely has to observe when droppage has occurred sufficient to cover and overlap the electrode aperture.

The significant features of this modification include: (1) compatability with small, less than 10 gram, paste samples; (2) direct deposition of but a drop or two upon the coaxial electrode configurations; (3) immediate adaptability to field use (when used with a small hand vacuum pump); (4) elimination of the problems posed by low-hydraulic-conductivity soils; (5) elimination of accuracy limiting problems of filter paper or other sorption media otherwise required in the strip sorption mode of the invention; and (6) instrument calibration independent of use for soil paste or liquid deposition.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

What is claimed is:
1. An apparatus for use in measuring the conductivity of a sample comprising:
   a central cylindrical electrode having a smooth, continuous surface for contact with said sample,
   an annular electrical insulator surrounding said central electrode and in contact therewith, said insulator having a smooth, continuous contact surface in the same plane as the contact surface of said central electrode, and
   an outer electrode surrounding said insulator and in contact therewith said outer electrode having a smooth, continuous contact surface in the same plane as the contact surfaces of said central elec- trode and said insulator, said central electrode, insulator and outer electrode forming a continuous, smooth plane surface for contact with said sample.

2. Apparatus as recited in claim 1 including a temperature compensating resistance positioned in said outer electrode.

3. Apparatus as recited in claim 1 including a dielectric sorption medium positioned over said electrodes.

4. Apparatus as recited in claim 3 further comprising a weighted electrode positioned on said dielectric sorption medium over both of said electrodes.

5. Apparatus as recited in claim 1 wherein said continuous outer electrode surrounds a plurality of annular electrical insulators each of said insulators surrounding a central electrode wherein the contact surfaces of all of said central electrodes, insulators and outer electrode form a continuous, smooth plane surface for contact with said sample.

6. Apparatus as recited in claim 5 wherein said contact surfaces of all of said electrodes are plated with a nonplatinized highly conductive material.

7. Apparatus as recited in claim 1 wherein said contact surfaces of said electrodes are plated with a non-platinized conductive material.

8. Apparatus as recited in claim 1 further comprising means for measuring the conductivity of a sample in contact with said electrodes.

9. Apparatus as recited in claim 1 further comprising:
 a bridge network having one arm thereof comprising said electrodes and a second arm thereof comprising variable resistor means,
 a square wave generator connected to said bridge network for providing square wave output signals,
 phase detector means connected to said bridge network and said square wave generator for providing output signals indicative of the null of said bridge network relative to said square wave output signals,
 means connected to said phase detector for providing complementary output signals,
 a DC averaging network for receiving said output signals and said complementary output signals for providing DC average output signals, and
 means connected to receive said DC average output signals for actuating indicator means.

10. Apparatus as recited in claim 9 wherein said contact surfaces of said electrodes are non-platinized.

11. Apparatus as recited in claim 1 further comprising:
 means for supporting a sample above the surface of said electrodes,
 filter means positioned between the surface of said electrodes and said sample, and
 means for pressure forcing a liquid constituent of said sample through said filter means for contact with the surface of said electrodes.

12. Apparatus as recited in claim 11 wherein said pressure forcing means comprises a housing defining a chamber above the surface of said electrodes between said electrode surfaces of said sample, and means for evacuating said chamber.

13. Apparatus for measuring the conductivity of a sample comprising electrode means for contacting said sample, said electrode means comprising:
 a central cylindrical electrode having a smooth, continuous surface for contact with said sample,
 an annular electrical insulator surrounding said central electrode and in contact therewith, said insulator having a smooth, continuous contact surface in the same plane as the contact surface of said central electrode, and
 an outer electrode surrounding said insulator and in contact therewith said outer electrode having a smooth, continuous contact surface in the same plane as the contact surfaces of said central electrode and said insulator, said central electrode, insulator and outer electrode forming a continuous, smooth plane surface for contact with said sample, said apparatus further comprising:
 square wave generator means for producing square wave signals,
 electrical impedance means,
 means for connecting said electrical impedance means and said electrode contact surfaces in a bridge circuit having an input and an output,
 means for connecting said square wave generator means to said bridge circuit, and
 means for measuring the output of said bridge circuit.

14. Apparatus as recited in claim 13 wherein said square wave generator produces square wave signals having a frequency greater than or equal to 100KHz and said electrode contact surfaces are non-platinized.

15. Apparatus as recited in claim 13 wherein said electrode contact surfaces are non-platinized.

16. Apparatus as recited in claim 13 wherein said means for measuring the output of said bridge circuit comprises means for digitally displaying the conductivity of said test sample.

17. Apparatus as recited in claim 13 wherein said electrical impedance means comprise variable resistors.

18. Apparatus as recited in claim 13 wherein said impedance means comprise a plurality of resistors connected in parallel by the actuation of a plurality of thumb wheel switches thereby providing direct digital readout of said sample conductivity at the null point of said bridge.

* * * * *